United States Patent
Dyson et al.

(10) Patent No.: US 9,419,851 B1
(45) Date of Patent: Aug. 16, 2016

(54) APPLICATION TRANSACTION TRACKING ACROSS NETWORK BOUNDARIES

(71) Applicant: CA, Inc., Islandia, NY (US)

(72) Inventors: Brian J. Dyson, San Diego, CA (US); Steven M. Firestone, San Diego, CA (US)

(73) Assignee: CA, Inc., Islandia, NY (US)

( * ) Notice: Subject to any disclaimer, the term of this patent is extended or adjusted under 35 U.S.C. 154(b) by 318 days.

(21) Appl. No.: 13/966,036

(22) Filed: Aug. 13, 2013

(51) Int. Cl.
*H04L 29/08* (2006.01)

(52) U.S. Cl.
CPC ............................ *H04L 29/08567* (2013.01)

(58) Field of Classification Search
CPC ..................... H04L 12/1831; H04L 29/08675; H04L 29/06897; H04L 43/0817
See application file for complete search history.

(56) References Cited

U.S. PATENT DOCUMENTS

| | | | | |
|---|---|---|---|---|
| 7,467,223 B2* | 12/2008 | Wu et al. | | 709/238 |
| 7,739,398 B1* | 6/2010 | Shabtay | | 709/232 |
| 8,189,487 B1* | 5/2012 | Mateski | | H04L 69/22 370/242 |
| 8,248,934 B2* | 8/2012 | Kosbab et al. | | 370/231 |
| 8,411,560 B2* | 4/2013 | Samuels | | H04L 12/24 370/229 |
| 8,576,722 B2* | 11/2013 | Bugenhagen | | H04W 24/02 370/216 |
| 8,644,144 B2* | 2/2014 | Wang | | H04L 41/5003 370/230 |
| 8,717,911 B2* | 5/2014 | Bugenhagen | | H04L 12/14 370/252 |
| 8,743,700 B2* | 6/2014 | Heinz | | H04L 41/0806 370/238 |
| 8,743,703 B2* | 6/2014 | Heinz | | H04L 41/5025 370/242 |
| 8,797,901 B2* | 8/2014 | Ji et al. | | 370/252 |
| 2002/0124095 A1* | 9/2002 | Sultan | | 709/230 |
| 2002/0147826 A1* | 10/2002 | Sultan | | 709/230 |
| 2003/0195861 A1* | 10/2003 | McClure | | H04L 41/12 |
| 2004/0052259 A1* | 3/2004 | Garcia | | H04L 12/2602 370/392 |
| 2008/0181213 A1* | 7/2008 | Ovsiannikov et al. | | 370/389 |
| 2010/0228650 A1* | 9/2010 | Shacham et al. | | 705/34 |

OTHER PUBLICATIONS

Barford, Paul, and Mark Crovella. "Critical path analysis of TCP transactions." ACM SIGCOMM Computer Communication Review 30.4 (2000): 127-138.*
Aracil, Javier, Daniel Morato, and Mikel Izal. "Analysis of Internet Services in IP over ATM networks." ATM, 1999. ICATM'99. 1999 2nd International Conference on. IEEE, 1999.*
Zhao, Yanrong, et al. "A Hardware-Based TCP Stream State Tracking and Reassembly Solution for 10G Backbone Traffic." Networking, Architecture and Storage (NAS), 2012 IEEE 7th International Conference on. IEEE, 2012.*
Clark, David D., and Wenjia Fang. "Explicit allocation of best-effort packet delivery service." Networking, IEEE/ACM Transactions on 6.4 (1998): 362-373.*
Uchida, Tomohisa. "Hardware-based TCP processor for gigabit ethernet." Nuclear Science, IEEE Transactions on 55.3 (2008): 1631-1637.*

(Continued)

*Primary Examiner* — Jimmy H Tran
(74) *Attorney, Agent, or Firm* — Coats & Bennett, P.L.L.C.

(57) ABSTRACT

A computing device is provided that automatically tags and tracks Transport Control Protocol (TCP) packets through one or more communications networks. An agent module at a sending device inserts tracking tags into the headers of TCP packets before sending the TCP packets to a remote receiving device. The receiving device also comprises an agent module that identifies and associates the tracking tags of the received TCP packets with the data carried by those TCP packets. The associations are stored in memory for later analysis by an application administrator or systems engineer.

19 Claims, 9 Drawing Sheets

(56) References Cited

OTHER PUBLICATIONS

Clerget, Antoine, and Walid Dabbous. "TUF: Tag-based unified fairness." INFOCOM 2001. Twentieth Annual Joint Conference of the IEEE Computer and Communications Societies. Proceedings. IEEE. vol. 1. IEEE, 2001.*

Benko, Peter, Gabor Malicsko, and Andras Veres. "A large-scale, passive analysis of end-to-end TCP performance over GPRS." INFOCOM 2004. Twenty-third AnnualJoint Conference of the IEEE Computer and Communications Societies. vol. 3. IEEE, 2004.*

Pang, Ruoming, et al. "The devil and packet trace anonymization." ACM SIGCOMM Computer Communication Review 36.1 (2006): 29-38.*

Wetherall, David J., and David L. Tennenhouse. "The active ip option." Proceedings of the 7th workshop on ACM SIGOPS European workshop: Systems support for worldwide applications. ACM, 1996.*

* cited by examiner

APPLICATION TRANSACTION TRACKING ACROSS NETWORK BOUNDARIES

BACKGROUND

The present disclosure relates to computer systems, and more specifically, to systems and computer-implemented methods for tracking Transmission Control Protocol (TCP) packets through one or more communication networks.

The Transmission Control Protocol (TCP) facilitates the reliable, orderly delivery of data packets between computing devices over a communications network. The use of TCP is common, for example, when user applications execute transactions on behalf of the users. Such applications include, but are not limited to, e-mail applications, file sharing applications, streaming media applications, data transfer applications (e.g., File Transfer Protocol (FTP)), and World Wide Web (WWW) applications.

In some cases, these applications must perform their intended functions in accordance with certain predefined service level agreement (SLA) requirements. In other cases, these applications perform certain analyses (e.g., a bottleneck analysis) to learn where a bottleneck occurs as a logical transaction takes place on a collection of networked systems.

BRIEF SUMMARY

The present disclosure provides a method and apparatus for tagging and tracking TCP packets as those packets travel between sending and receiving devices through one or more communications networks.

In one embodiment, a user agent module executing at a sending device, such as a computer device, for example, intercepts a function call invoking a send function. The function call may have been issued by a user application executing at the sending device, for example, and indicates data to be sent to a receiving device in one or more Transmission Control Protocol (TCP) packets via a communications network. Upon intercepting the call to the send function, the user agent module sets a tracking tag to be associated with the data, and then invokes the originally called send function. Invoking the originally called send function causes the sending device to insert the tracking tag into a header of the TCP packets and send the TCP packets, including the tracking tag, to the receiving device via the network.

In another embodiment, a user agent module executing at a receiving device intercepts a function call from a user application executing on the receiving device. The function call invokes a receive function to receive TCP packets sent by a sending device via a communications network. Responsive to intercepting the call to the receive function, the user agent module at the receiving device sets a tracking tag that is to be associated with the data carried by the incoming TCP packets. The tracking tag is carried in the header of the incoming TCP packets. The user agent module then invokes the originally called receive function to associate the data received with the incoming TCP packets with the tracking tag, and stores the association in a memory circuit accessible to the receiving device.

The associations may comprise, for example, mappings that are stored in memory. An application administrator or systems engineer can then mine and analyze the data which has been enhanced to include the transaction tag. This extended tagging enables a more complete view of the end to end transaction.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
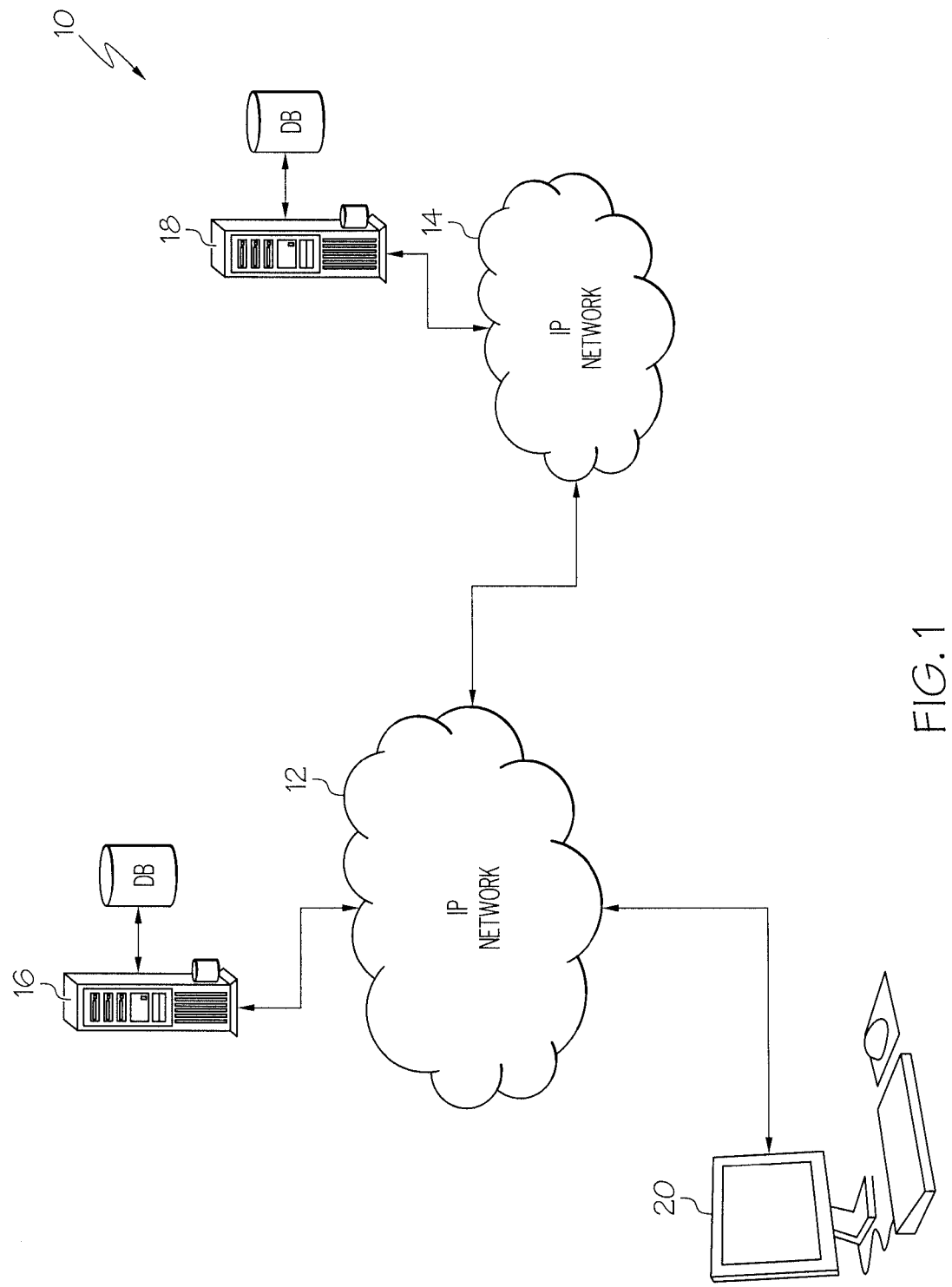
FIG. 1 is a block diagram illustrating a communications system configured in accordance with one aspect of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, aspects of the present disclosure provide an apparatus and computer-implemented method for tagging and tracking Transmission Control Protocol (TCP) packets through one or more communications networks. More particularly, when a sending device wishes to send data to a destination device, it associates a tracking tag with the data that will be carried by the TCP packets and inserts the tag into the TCP header of each of the TCP packets. The sending device then stores that association in memory. As the TCP packets travel through the network to the destination device, the devices that process the TCP packets (e.g., network servers, gateways, etc.), as well as the destination device, may also associate the tracking tags with the data carried by the packet, and store the association as a mapping, for example, in memory. Thereafter, users or network operators such as administrators and systems engineers, for example, can access and analyze the stored associations to determine a variety of different information about the movement of the TCP packets through the network.

The present disclosure provides a variety of benefits and advantages that conventional systems and methods do not provide. For example, with conventional methods, tracking transactions requires Remote Method Invocation (RMI) argument injection, which requires RMI support at both sending and receiving devices. Further, conventional methods do not facilitate the tracking of such packets across disparate, but interconnected, networks. Additionally, at times, conventional methods require that the code defining the user-level applications on one or both of the user device and a server be modified specifically to incorporate the monitoring and tracking activities.

The present disclosure, however, requires no changes to the underlying TCP protocol. Nor does it interfere with the data carried in the TCP packets, or require that any given receiving device be configured to receive the transmitted message and store the association. Any device that can communicate using the TCP protocol is capable of operating according to the embodiments described herein. Moreover, the present disclosure facilitates such tagging and analysis to occur across disparate, but interconnected, networks, and also supports different tags being used over a single connection that may or may not be allocated from a pool of connections.

Turning now to the drawings, FIG. 1 is a block diagram illustrating a communications system 10 configured according to aspects of the present disclosure. As seen in FIG. 1, the system 10 comprises a plurality of public and/or private interconnected IP networks 12, 14, each having one or more network servers 16, 18 communicatively connected thereto, and a user device 20.

The servers 16, 18 may be any type of servers and perform any known network function. However, in one aspect, one or both of the servers 16, 18 comprise network application servers that execute user-level applications that handle requests from, and communicate data with, user device 20. By way of example only, one or both of the servers 16, 18 may execute a database application. In such cases, a user-level application executing on user device 20 may communicate with the network application server 16, which may operate locally, to request data. Server 16 may then, in turn, provide the requested data from its own database, for example, or obtain the data from a database associated with the remote server 18, and forward the retrieved data to user device 20. Such data is communicated in TCP packets, and may comprise, for example, data associated e-mail applications, file sharing applications, streaming media applications, data transfer applications, and WWW applications.

The user device 20 may communicate data with one or both of the servers 16, 18 across one or both of the networks 12, 14 in packets in accordance with the Transmission Control Protocol (TCP). As is well known in the art, TCP packets comprise one or more TCP segments, each having a TCP header section and a TCP payload section. Conventionally, the TCP headers carry information such as the source and destination addresses; however, in accordance with the aspects of the present disclosure, the headers of each of the TCP segments are modified prior to being transmitted to a destination device to facilitate the tracking of the TCP packets through one or both of the networks 12, 14.

Figure 2:
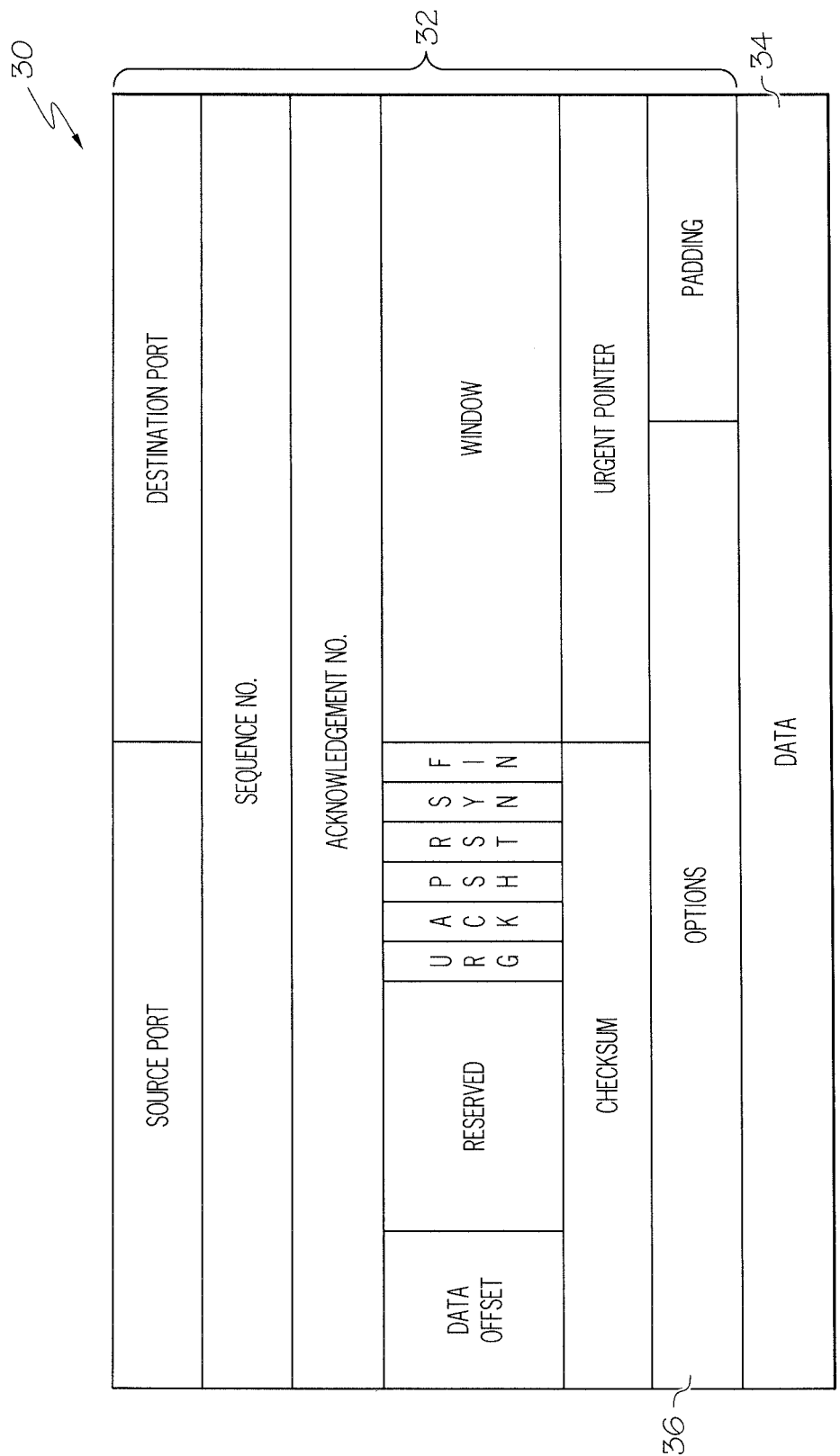
FIG. 2 is a block diagram illustrating a structure for a TCP segment modified in accordance with one aspect of the present disclosure.

In more detail, FIG. 2 illustrates the structure of a TCP packet 30 in accordance with one or more aspects of the disclosure. As seen in FIG. 2, TCP packet 30 comprises a TCP header section 32, and a TCP payload section 34. The TCP header 32, in turn, is comprised of a plurality of mandatory fields and a variable length "Options" field 36. The mandatory fields are well defined and known to those of ordinary skill in the art, and therefore, their specific functions and descriptions are not described in detail here. However, the Options field 36 is utilized by aspects of the present disclosure to facilitate the tagging and tracking of the TCP segment 30 as the segment 30 travels through one or both of the networks 12, 14.

More particularly, the length of the Options field 36 is variable and comprises three different subfields—the Option Kind subfield, the Option Length subfield, and the Option Data subfield. The Option Kind subfield holds one byte and indicates an option type. The Option Kind subfield is the only field of the Options field 36 that is mandatory. Based on the value for Option Kind, the Option Length and Option Data subfields may be set. Particularly, the Option Length subfield indicates a total length for an option defined in the Option Kind subfield (unless the Option Kind carries a value that equals '0' or '1'), and the Option Data subfield carries the actual option data.

In operation, aspects of the present disclosure utilize the Options field 36 to track the TCP packets. More particularly, the sending device first associates the data to be carried in the payload section 34 with a tracking tag. The tracking tag may be any value known or desired, but in this aspect, comprises a predetermined value that is maintained at both the sending device and the receiving device. The association may comprise, for example, a mapping of the tracking tag to the data carried by the TCP packet 30, or a mapping of the tracking tag to a transaction identifier in the TCP packet 30, or a mapping of the tracking tag to some other indicator in the TCP packet 30. Regardless of the particular mapping, however, a sending device operating in accordance with one or more embodiments of the present disclosure stores the association in memory for later processing and inserts the tracking tag into the Option Data section of the Options field 36 of the TCP header 32.

To be TCP compliant, a sending device configured according to the present disclosure sets the TCP Option Kind, Option Length, and Option Data subfields for the tracking tag. The specific value of Option Kind that is inserted into the Options field 36 may be any value desired so long as it is first approved by the Internet Assigned Number Authority (IANA). Experimentally, however, a value of 254 may be employed.

As an example, consider tracking tag to be a 32-bit value of 0x01234567. Consider also that the value for the Option Kind subfield is 0x7e, and that the length of the option in bytes (i.e., the Option Length subfield), is 0x06. Therefore, to be TCP compliant, a sending device configured to operate according to aspects of the present disclosure would insert TCP Option tuple (i.e., the Option Kind, Option Length, and Option Data subfields) 0x7e, 0x06, 0x01234567 as the tracking tag into the Options field 36 of the TCP header 32 before transmitting the TCP packet 30 through the network.

As the TCP packets 30 are received, the receiving device(s) identify the tracking tags and store the associations between the tracking tags and the data in the TCP payload section 34 in memory. As above, the association may comprise mappings of the tracking tag received in a given Options field 36 of a given TCP packet 30 and the data or other indicator within that TCP packet 30. The mappings are stored to memory, and thereafter, an application administrator or systems engineer can access and analyze this information to understand the transaction performance.

Figure 3:
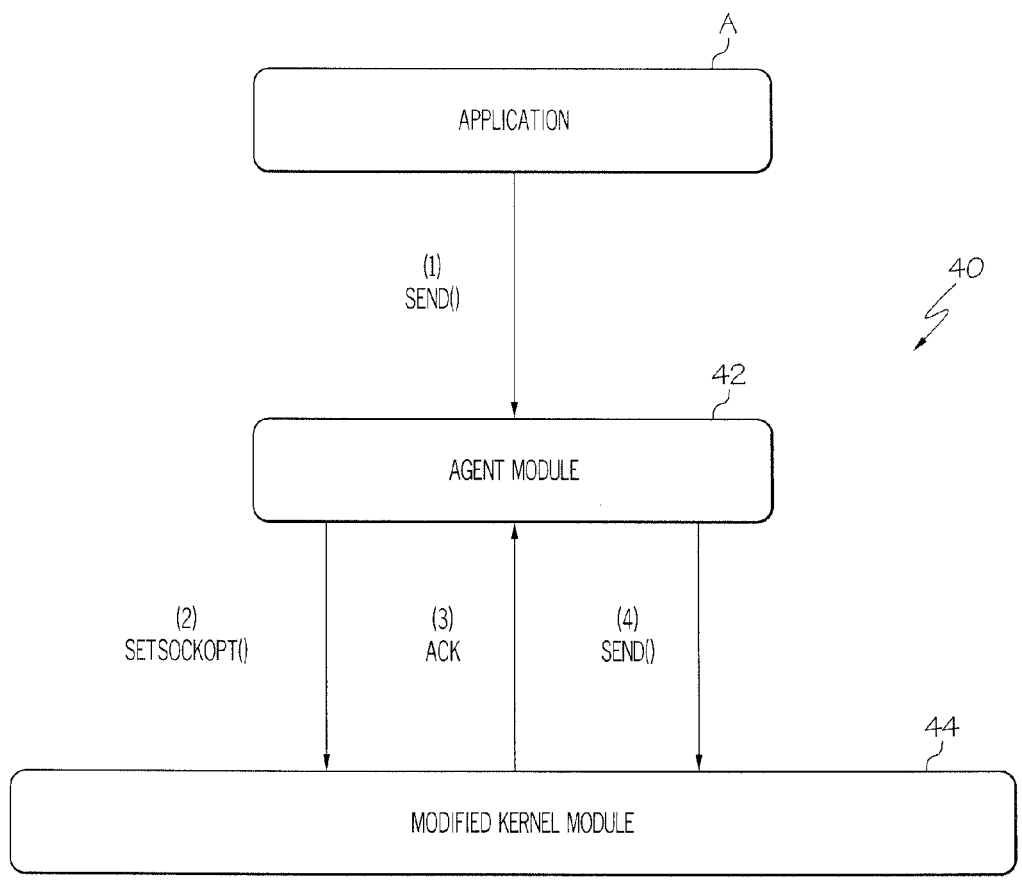
FIG. 3 is a block diagram illustrating some component modules configured to tag and track TCP packets through one or more communications networks in accordance with one aspect of the present disclosure.

FIG. 3 illustrates the component modules that may exist at a sending device, such as server 16, for example, for performing aspects of the present disclosure. Particularly, aspects of the present disclosure provide a TCP tracker 40 that comprises two related components—an agent module 42 and a modified kernel module 44. Both the agent module 42 and the modified kernel module 44 may comprise software, hardware, or a combination of software and hardware. The agent module 42 lies between the user application A and the modified kernel module 44. In operation, agent module 42 receives data and commands from Application A, and makes calls to the modified kernel module 44 to modify the TCP packets 30 that are to be generated on behalf of application A before the packets are sent to a destination device. To support such control, the modified kernel module 44 is configured to set the tracking tags in the TCP headers 32 in response to the calls from the agent module 42.

In more detail, the agent module 42 is configured to perform multiple functions. Particularly, upon being initialized by user application A, agent module 42 first locates the address of a conventional send( ) function in a function import table stored at the sending device. The agent module 42 then records this location in memory, and modifies the function import table to call a custom send( ) function associated with the agent module 42 instead. Thereafter, when user application A, which loaded the agent module 42, makes a function call to the send( ) function (1), the modified function import table ensures that the custom send( ) function is implemented by the agent module 42 instead of the conventional send( ) function. During the execution of the custom send( ) function, the agent module 42 retrieves a tracking tag value and calls the setsockopt( ) function (2) to associate the tracking tag with a socket. The agent module 42 may then receive an ACK from the modified kernel module 44 (3), and in response, call the conventional send( ) function (4) to instruct the modified kernel module 44 to queue the data to be sent to the receiving device.

The modified kernel module 44 is also modified to perform multiple functions. Specifically, the modified kernel module 44 is modified to enhance the socket option Application Programming Interface (API) so that user applications may set the TCP options that will be inserted as tracking tags into the TCP headers 32 of the TCP packets 30 that are sent to other devices. More particularly, after receiving the call to the setsockopt( ) function, the modified kernel module 44 associates the TCP Option tuple (i.e., the tracking tag) with the kernel socket object. Thereafter, when the conventional send( ) function is called by a user-mode process, such as user application A, for example, the modified kernel module 44 associates the current value of the TCP Option tuple (i.e., the tracking tag) with the data or other indicator of the TCP packet 30 that is queued to be sent. The modified kernel module 44 then inserts the TCP Option tuple into the Options field 36 of the TCP header 30, and sends the TCP packet 30 to the intended receiving device.

Figure 4:
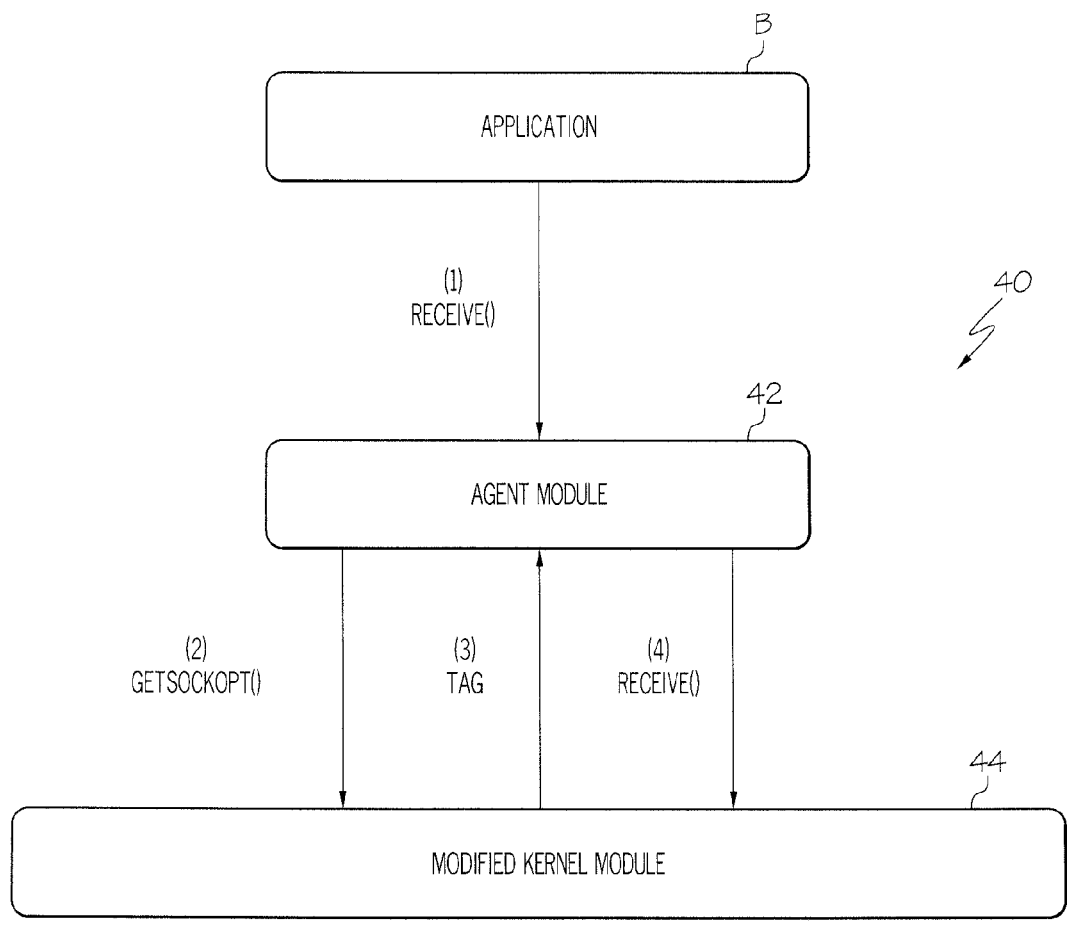
FIG. 4 is a block diagram illustrating some component modules configured to receive and track TCP packets received from a communications network in accordance with one aspect of the present disclosure.

FIG. 4 illustrates the component modules that may exist at a device that receives the transmitted TCP packets, such as server 18, for example. As seen in FIG. 4, the receiving device also comprises a TCP packet tracker 40 comprising an agent module 42 and a modified kernel module 44. Upon being initialized by user application B, agent module 42 locates the address of a conventional receive( ) function in the function import table stored at the receiving device. As above, the agent module 42 records this address in memory, and modifies the function import table to replace the address of the conventional send( ) function with the address of a custom receive( ) function associated with the agent module 42. Thereafter, because of the modification to the function import table, calls made by Application B to the conventional receive( ) function will instead invoke the custom receive( ) function.

In operation, the user application B first issues a call to the conventional receive( ) function (1). The conventional receive( ) function comprises logic for receiving incoming packets that is typically provided by the underlying platform on which the application B is executing.

As one example, the user application B may invoke the conventional receive( ) function to receive data on a given TCP port, which is intercepted by the user agent module 42 executing at the receive device. Upon intercepting the call, the modified function import table ensures that the agent module 42 invokes a custom receive( ) function instead of the conventional receive( ) function. The custom receive( ) function then calls a getsockopt( ) function (2) to determine whether the Options field 36 of an incoming TCP packet 30 includes a tracking tag set by the sending device. The getsockopt( ) function indicates (3) the results of that determination to the custom receive( ) function at the agent module 42. If the getsockopt( ) function indicates that the incoming TCP packet 30 includes a tracking tag in the Options field 36 of the TCP header 32, the custom receive( ) function at the agent module 42 invokes the conventional receive( ) function (4) provided by the platform to receive the incoming TCP packet 30. The custom receive( ) function also associates the tracking tag to the data carried by the TCP payload 32 of the incoming TCP packet 30.

In some embodiments, all subsequently received TCP packets 30 will be associated with the tracking tag initially identified by the getsockopt( ) function. However, the getsockopt( ) function at the receiving device will also monitor the incoming TCP packets 30 and identify when the tracking tag changes in a subsequently received TCP packet. When the getsockopt( ) function determines that the tracking tag has changed, the getsockopt( ) function returns the newly determined tracking tag to the agent module 42. The agent module 42, in turn, then associates all subsequently received TCP packets 30 with the new tracking tag until the tracking tag once again changes.

Figure 5A:
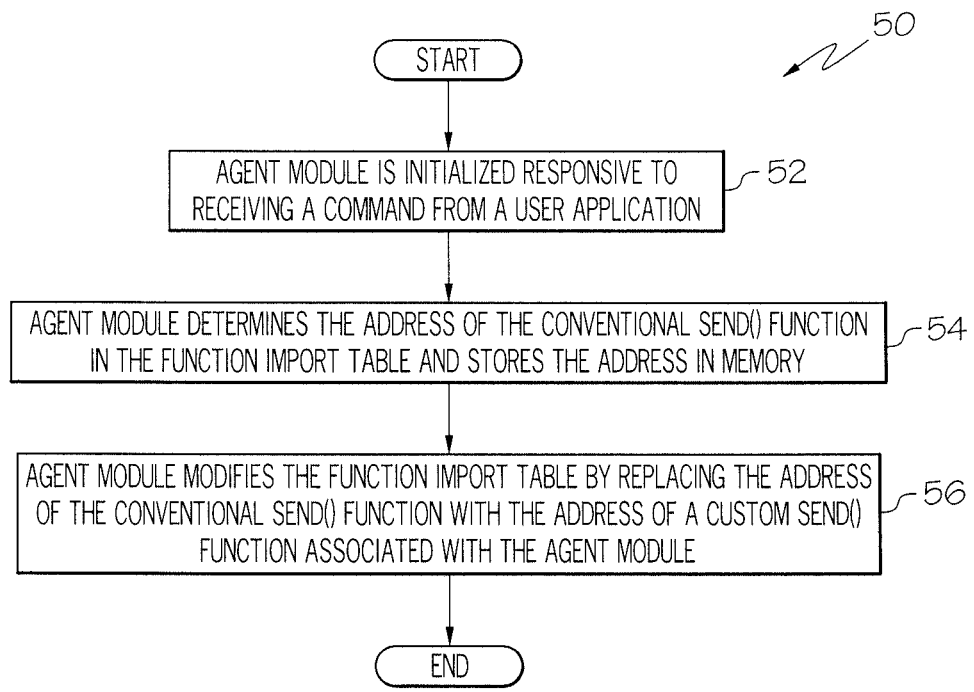
FIGS. 5A-5B are flow diagrams illustrating a method performed by a sending device to tag and track TCP packets in accordance with one aspect of the present disclosure.
Figure 5B:
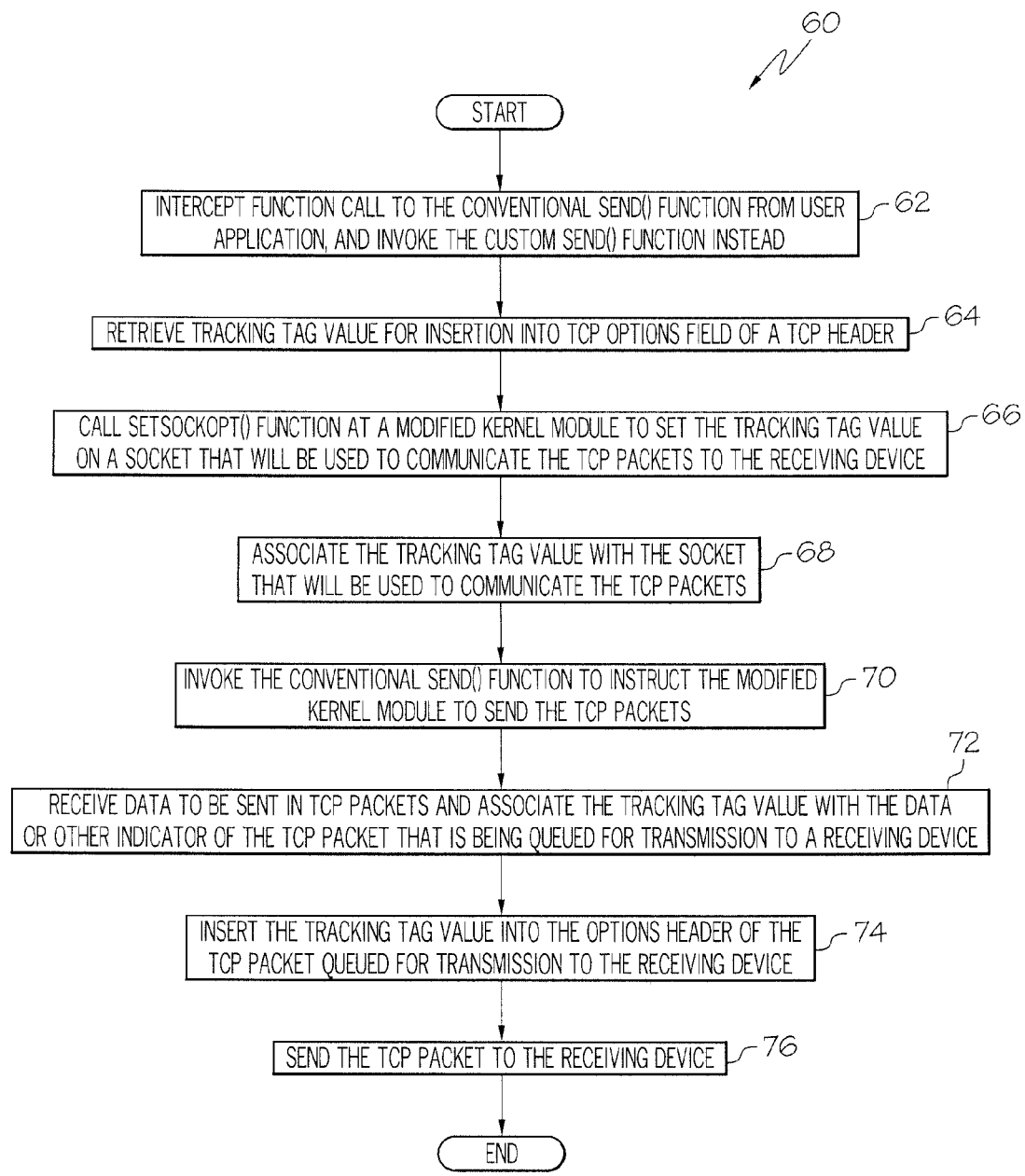

FIGS. 5A-5B are flow diagrams illustrating a method of performing an embodiment of the present disclosure. More particularly, FIG. 5A illustrates a method 50 performed by a sending device, such as server 16, of initializing the agent module 42. Once initialized, the agent module 42 may control the modified kernel module 44 to modify and send TCP packets 30 modified according to one embodiment so that the TCP packets 30 may be tracked as those packets 30 traverse a network, or disparate networks.

Method 50 begins with the agent module 42 receiving a message or command, for example, from the user application A (box 52). The message or command may be a signal or any other indicator received by the agent module 42 that launches the execution of the agent module 42. Once launched, the agent module 42 determines the address of a conventional send( ) function from the function import table and stores that address in memory (box 54). As known in the art, the function import table is a table that contains the names of functions that are linked dynamically at runtime along with the exact address of the function in its associated library. Once the address of the conventional send( ) function is saved to memory, the agent module 42 modifies the function import table by replacing the address of the conventional send( ) function in the function import table with the address of a custom send( ) function associated with the agent module 42 (box 56). Thereafter, any calls that are made to the conventional send( ) function from application A instead invoke the custom send( ) function.

More specifically, once the function import table is modified, the agent module 42 and the modified kernel module 44 can perform the functions necessary to track TCP packets 30 sent by the Application A across one or more disparate networks. Particularly, FIG. 5B illustrates a method 60 according to one embodiment in which the agent module 42 intercepts a call to invoke the conventional send( ) function from the Application A. However, because the function import table was modified, the custom send( ) function associated with the agent module 42 is invoked instead of the conventional send( ) function (box 62). The custom send( ) function associated with the agent module 42 then retrieves a tracking tag value for insertion into the TCP Options fields 36 in the TCP headers 32 of the packets 30 to be transmitted (box 64). As previously stated, the tracking tag value may be any value needed or desired, but in one embodiment, comprises respective values for the TCP Option Kind, Option Length, and Option Data subfields to be inserted into the TCP Options field 36.

After retrieving the tracking tag value, the custom send( ) function associated with the agent module 42 invokes the setsockopt( ) function at the modified kernel module 44 to set the tracking tag value on a socket that will be employed to communicate the TCP packets 30 (box 66). Particularly, the modified kernel module 44 associates the tracking tag (i.e., the respective values for the TCP Option Kind, Option Length, and Option Data subfields of the TCP Options field 36) with the socket that will communicate the TCP packets to the intended receiving device (box 68). Thereafter, once the custom send( ) function has successfully set the tracking tag for tracking the TCP packets 30, which may be indicated by an ACK received from the modified kernel module 44, for example, the custom send( ) function associated with the agent module 42 invokes the conventional send( ) function to instruct the modified kernel module 44 to queue the TCP packets to send to the receiving device (box 70). The call to invoke the conventional send( ) function is possible at this point because, as previously stated, the agent module 42 saved the address of the conventional send( ) function in memory upon being initialized.

In response to receiving the conventional send( ) function call from agent module 42, the modified kernel module 44 receives the data to be sent to the receiving device, segments the data into one or more TCP packets 30, if needed, and associates the tracking tag (i.e., the values for the TCP Option Kind, Option Length, and Option Data subfields) with the TCP packets 30 being queued for transmission to the receiving device. As previously stated, the modified kernel module 44 may associate the tracking tag with the data to be sent in the TCP packets 30, and/or some other desired indicator of the TCP packets 30 (box 72). The modified kernel module 44 then inserts the tracking tag into the TCP Options field 36 of the TCP headers 32 of each TCP packet 30 (box 74), and sends the TCP packets 30 to the receiving device (box 76).

Figure 6A:
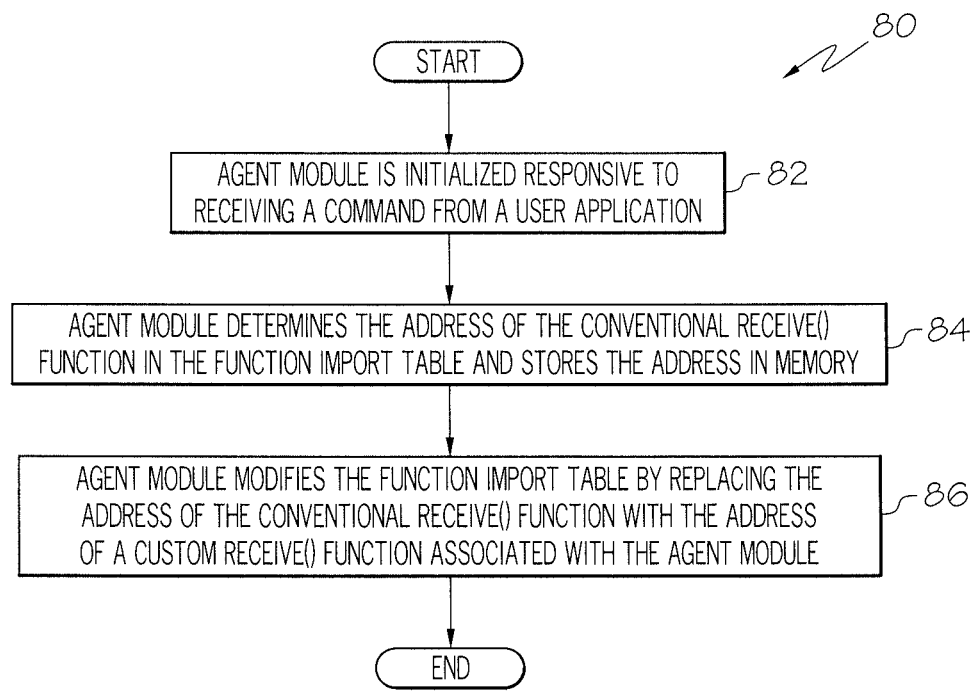
FIGS. 6A-6B are flow diagrams illustrating a method performed by a receiving device to receive and track TCP packets in accordance with one aspect of the present disclosure.
Figure 6B:
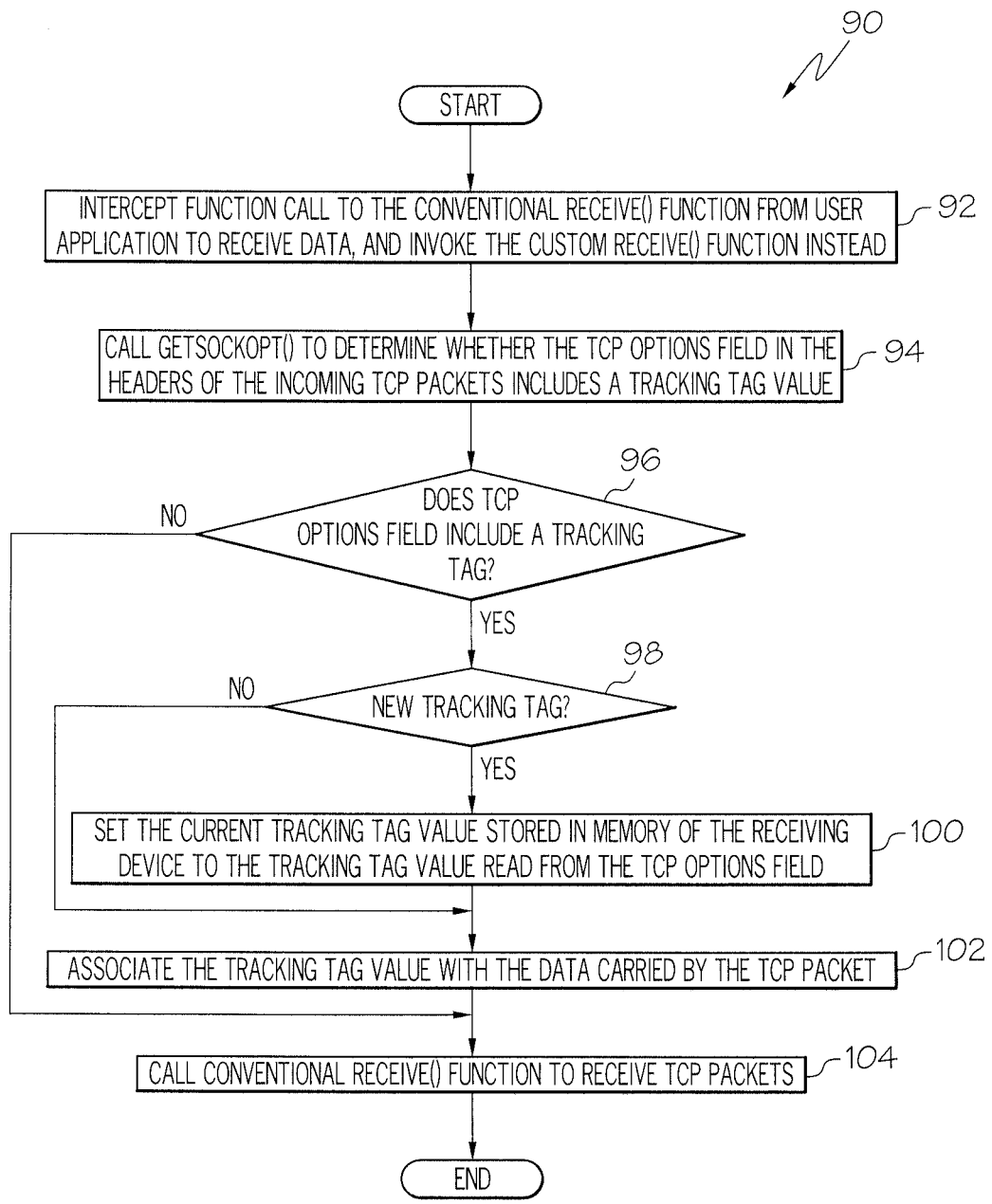

FIGS. 6A-6B are flow diagrams illustrating methods of an embodiment of the present disclosure performed at the receiving device. More particularly, FIG. 6A illustrates a method 80 of initializing the agent module 42 at the receiving device, such as server 18, for example. Once initialized, the agent module 42 at the receiving device may control the modified kernel module 44 to receive TCP packets 30 modified by a sending device, such as server 16, for example, to facilitate the tracking of the TCP packets 30 as they traverse a network, or disparate, but interconnected, networks.

Method 80 begins with the agent module 42 being initialized by the user Application B executing at the receiving device (box 82). The initialization of the agent module 42 may, as above, be performed in response to a command or other indicator sent by Application B. During initialization, the agent module 42 determines the address of a conventional receive( ) function from the function import table and stores that address in its memory (box 84). The agent module 42 then modifies the function import table by replacing the address of the conventional receive( ) function with the address of a custom receive function( ) associated with the agent module 42 at the receiving device (box 86). As above, this modification will cause all calls to the conventional receive( ) function from the user Application B to instead invoke the custom receive( ) function.

FIG. 6B illustrates a method 90 by which the receiving device tags the data of incoming TCP packets 30 to facilitate the tracking of the packets across one or more networks. Method 90 begins when the agent module 42 intercepts a function call to invoke the conventional receive( ) function from Application B (box 92). However, because of the modified function import table, the custom receive( ) function associated with the agent module 42 is invoked instead of the conventional receive( ) function. Once invoked, the custom receive( ) function calls the getsockopt( ) function to determine whether a given incoming TCP packet 30 comprises a tracking tag (box 94). By way of example only, the getsockopt( ) function may inspect the TCP Options field 36 of the TCP header 32 and indicate to the agent module 42 whether that field comprises a tracking tag. Such indications may comprise, for example, an acknowledgement, a message, a returned value, or any other indicator known in the art that identifies the tracking tag. The custom receive( ) function associated with the agent module 42, upon receiving the indication, can then determine whether TCP packet 30 comprises a tracking tag value (box 96).

If there is no tracking tag in the TCP Options field 36 (box 96), the custom receive( ) function associated with the agent module 42 simply calls the conventional receive( ) function to receive the TCP packets 30 (box 104). Otherwise, if the incoming TCP packet 30 does include a tracking tag in the TCP Options field 36, the custom receive( ) function associated with the agent module 42 will determine whether the tracking tag value is the same value as a previous packet, or whether the tracking tag has changed (box 98). The determination may be performed, for example, by maintaining a value representing a current tracking tag in memory of the receiving device, and comparing the tracking tag received with the TCP packets 30 to the stored value. If the two values remain the same, method 90 associates the data of the incoming TCP packet 30 with the currently stored tracking tag value (box 102). Otherwise, the custom receive( ) function associated with the agent module 42 sets the value for the current tracking tag to the value of the newly received tracking tag (box 100), associates the newly received tracking tag with the data carried by the TCP packet 30 (box 102), and calls the conventional receive( ) function to receive the incoming TCP packets 30 (box 104), as previously described.

As previously stated, each device that receives and processes the TCP packets 30, such as server 18, for example, may perform the methods according to this embodiment. This allows an application administrator or systems engineer to later mine the data as needed or desired.

Figure 7:
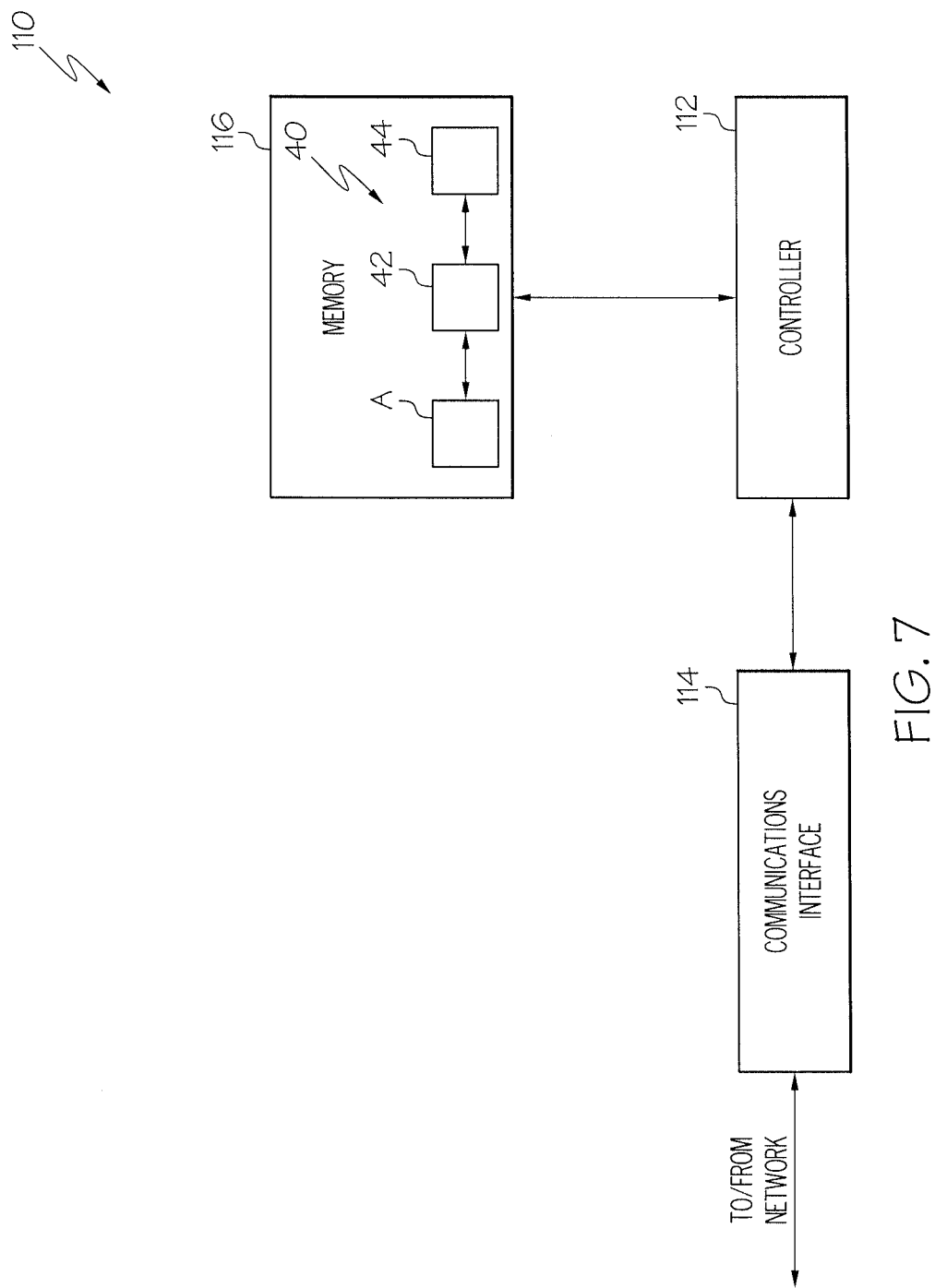
FIG. 7 is a block diagram illustrating some component parts of a device configured to communicate TCP packets according to one aspect of the present disclosure.

FIG. 7 is a block diagram illustrating some components of a computing device 110 configured to function in accordance with one or more aspects of the present disclosure. The device 110, which may comprise any of the computing devices seen in FIG. 1 (e.g., the server 16), for example, may be configured to perform the TCP packet tracking process previously described. Further, the device 110 seen in FIG. 7 includes the agent module 42 and the system module 44, and thus, may perform the sending functions, in which the tracking tag values are identified and inserted into the TCP headers 32 of the TCP packets 30, as well as the receive functions in which the tracking tag values are identified and associated with the received payload data. For simplicity, only a sending device is illustrated herein; however, those of ordinary skill in the art will appreciate that a receiving device comprises similar components. Further, those skilled in the art will appreciate that the device illustrated in FIG. 7 may comprise a device configured to both send and receive according to one or more embodiments of the present disclosure.

As seen in FIG. 7, the computing device 110 comprises a programmable controller 112, a communications interface 114, and a memory 116. The programmable controller 112 may be implemented by one or more microprocessors, hardware, firmware, or a combination thereof, and generally controls the operation and functions of the computing device 110 according to the appropriate standards. Such operations and functions include, but are not limited to, communicating with other network servers, such as server 16, via one or more communications networks 12, 14, and implementing logic and instructions contained in the agent module 42 and the modified kernel module 44 stored in memory 116 to perform the methods according to the previously described embodiments.

The communications interface 114 comprises a transceiver or other communications interface known in the art that facilitates the communications with one or more remote devices over one or more communications networks, such as networks 12 and/or 14. Such an interface may comprise, for example, an ETHERNET component capable of communicating data and information over a communications network as is known in the art. In one aspect, the controller 112, in accordance with the instructions in the agent and modified kernel modules 42, 44 of TCP tracker 40, invokes the conventional send( ) and receive( ) functions normally provided with the modified kernel module 44, as well as the custom send( ) and receive ( ) functions, as previously described.

The memory 116 may comprise any non-transitory, solid state memory or computer readable media known in the art. Suitable examples of such media include, but are not limited to, ROM, DRAM, Flash, or a device capable of reading computer-readable media, such as optical or magnetic media. The memory 116 stores programs and instructions, such as the user applications A and/or B and the TCP tracker 40 that may be executed by controller 112 to perform the methods of the present disclosure.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method, performed by a sending device, comprising:
   intercepting a function call invoking a send function, the function call indicating data to be sent to a receiving device in a payload section of a Transmission Control Protocol (TCP) packet via a communications network;
   setting a tracking tag responsive to intercepting the function call, wherein setting the tracking tag comprises:
      mapping the tracking tag to the data in the payload section of the TCP packet; and
      associating the tracking tag with a socket over which the TCP packet will be sent to the receiving device;
   invoking the send function;
   inserting the tracking tag into a header of the TCP packet;
   sending the TCP packet including the tracking tag and the data to the receiving device via the communications network;
   inserting the tracking tag into the header of each of a plurality of TCP packets that are communicated to the receiving device over the socket until a new tracking tag is retrieved;
   associating the new tracking tag with the socket responsive to retrieving the new tracking tag; and
   inserting the new tracking tag into the header of each TCP packet that is communicated over the socket to the receiving device.

2. The method of claim 1 further comprising storing the mapping in a memory associated with the sending device.

3. The method of claim 1 wherein the send function comprises a first send function, and further comprising:
   maintaining a function table associating the first send function to an address;
   storing the address of the first send function in a memory circuit associated with the sending device;
   updating the address of the first send function in the function table with an address of the second send function; and
   invoking the second send function responsive to intercepting the function call invoking the first send function based on the updated address.

4. The method of claim 3 wherein the second send function is configured to invoke a kernel function that associates the tracking tag to the socket over which the TCP packet is sent to the receiving device.

5. A computing device comprising:
   a communications interface configured to communicate data with a receiving device in Transmission Control Protocol (TCP) packets via a communications network;
   a memory circuit; and
   a processing circuit operatively connected to the communications interface and the memory circuit and configured to:
      intercept a function call invoking a send function, the function call indicating the data to be sent to the receiving device in a payload section of the TCP packet;
      set a tracking tag responsive to intercepting the function call, wherein to set the tracking tag, the processing circuit is configured to:
         map the tracking tag to the data in the payload section of the TCP packet; and
         associate the tracking tag with a socket over which the TCP packet will be sent to the receiving device;
      invoke the send function;
      insert the tracking tag into a header of the TCP packet;
      send the TCP packet including the tracking tag and the data to the receiving device via the communications interface;
      insert the tracking tag into the header of each of a plurality of TCP packets that are communicated to the receiving device over the socket until a new tracking tag is retrieved;

associate the new tracking tag with the socket responsive
to retrieving the new tracking tag; and
insert the new tracking tag into the header of each TCP
packet that is communicated over the socket to the
receiving device.

6. The computing device of claim 5 wherein the processing circuit is further configured to store the mapping in the memory.

7. The computing device of claim 5 wherein the send function comprises a first send function, and wherein the processing circuit is further configured to:
maintain a function table associating the first send function to an address;
storing the address of the first send function in the memory circuit;
update the address of the first send function in the function table with an address of the second send function; and
invoke the second send function responsive to intercepting the function call invoking the first send function based on the updated address.

8. The computing device of claim 7 wherein the second send function is configured to call a kernel function that associates the tracking tag to the socket over which the TCP packet is sent to the receiving device.

9. A computer program product comprising a non-transitory computer readable storage medium comprising computer readable program code embodied therewith, the computer readable program code comprising an agent module and a kernel module that, when executed by a processing circuit of a sending device, controls the sending device to:
intercept a function call invoking a send function, the function call indicating data to be sent to a receiving device in a payload section of a Transmission Control Protocol (TCP) packet via a communications network;
set a tracking tag responsive to intercepting the function call, wherein to set the tracking tag, the sending device is controlled to:
map the tracking tag to the data sent in the payload section of the TCP packet; and
associate the tracking tag with a socket over which the TCP packet will be sent to the receiving device;
invoke the send function;
insert the tracking tag into a header of the TCP packet; and
send the TCP packet including the tracking tag and the data to the receiving device via the communications network;
insert the tracking tag into the header of each of the plurality of TCP packets that are communicated to the receiving device over the socket until a new tracking tag is retrieved;
associate the new tracking tag with the socket responsive to retrieving the new tracking tag; and
insert the new tracking tag into the header of each TCP packet that is subsequently communicated over the socket to the receiving device.

10. The computer program product of claim 9 wherein the computer readable program code is further configured to control the sending device to store the mapping in a memory associated with the sending device.

11. A method, performed by a receiving device, comprising:
intercepting a function call invoking a receive function, wherein the receive function is configured to receive a plurality of incoming Transmission Control Protocol (TCP) packets comprising data via a communications network;
setting a current tracking tag in a memory of the receiving device to a tracking tag included in a header of an incoming TCP packet responsive to intercepting the function call, wherein the tracking tag included in the header of an incoming TCP packet is mapped to the data in a payload section of the TCP packet, and is associated with a socket over which the TCP packet was sent to the receiving device;
invoking the receive function;
associating the current tracking tag with the data in each of the plurality of incoming TCP packets;
storing the association in a memory accessible to the receiving device; and
updating the current tracking tag to the tracking tag included in the header of a subsequent incoming TCP packet if the tracking tag included in the header of the subsequent incoming TCP packet is different from the current tracking tag.

12. The method of claim 11 wherein the receive function comprises a first receive function, and further comprising:
maintaining a function table associating the first receive function to an address;
storing the address of the first receive function in a memory circuit associated with the receiving device;
updating the address of the first receive function in the function table with an address of the second receive function; and
invoking the second receive function based on the updated address responsive to intercepting the function call invoking the first receive function.

13. The method of claim 12 wherein the second receive function is configured to invoke a kernel function that sets the current tracking tag to the tracking tag included in the header of the incoming TCP packet.

14. The receiving device of claim 12 wherein the second receive function is configured to call a kernel function that sets the current tracking tag to the tracking tag included in the header of the incoming TCP packet.

15. A receiving device comprising:
a communications interface configured to communicate data with a sending device in Transmission Control Protocol (TCP) packets via a communications network;
a memory circuit; and
a processing circuit operatively connected to the communications interface and the memory circuit and configured to:
intercept a function call invoking a receive function, wherein the receive function is configured to receive a plurality of TCP packets comprising data via the communications interface;
set a current tracking tag in the memory circuit to a tracking tag included in a header of an incoming TCP packet responsive to intercepting the function call, wherein the tracking tag included in the header of an incoming TCP packet is mapped to the data in a payload section of the TCP packet, and is associated with a socket over which the TCP packet was sent to the receiving device;
invoke the receive function;
associate the current tracking tag with the data in each of the plurality of incoming TCP packets;
store the association in the memory circuit; and
update the current tracking tag to the tracking tag included in the header of a subsequent incoming TCP packet if the tracking tag included in the header of the subsequent incoming TCP packet is different from the current tracking tag.

16. The receiving device of claim 15 wherein the receive function comprises a first receive function, and wherein the processing circuit is further configured to:
- maintain a function table associating the first receive function to an address;
- store the address of the first receive function in the memory circuit;
- update the address of the first receive function in the function table with an address of the second receive function; and
- invoke the second receive function based on the updated address responsive to intercepting the function call invoking the first receive function.

17. A computer program product comprising a non-transitory computer readable storage medium comprising computer readable program code embodied therewith, the computer readable program code comprising an agent module and a kernel module that, when executed by a processing circuit of a receiving device, controls the receiving device to:
- intercept a function call invoking a receive function, wherein the receive function is configured to receive a plurality of Transmission Control Protocol (TCP) packets comprising data via a communications network;
- set a current tracking tag in a memory circuit associated with the receiving device to a tracking tag included in a header of an incoming TCP packet responsive to intercepting the function call, wherein the tracking tag included in the header of an incoming TCP packet is mapped to the data in a payload section of the TCP packet, and is associated with a socket over which the TCP packet was sent to the receiving device;
- invoke the receive function;
- associate the current tracking tag with the data in each of the plurality of incoming TCP packets;
- store the association in the memory circuit; and
- update the current tracking tag to the tracking tag included in the header of a subsequent incoming TCP packet if the tracking tag included in the header of the subsequent incoming TCP packet is different from the current tracking tag.

18. The computer program product of claim 17 wherein the computer readable program code is further configured to control the receiving device to:
- maintain a routing table associating the first receive function to an address;
- store the address of the first receive function in the memory circuit;
- update the address of the first receive function in the routing table with an address of the second receive function; and
- invoke the second receive function based on the updated address responsive to intercepting the function call invoking the first receive function.

19. The computer program product of claim 17 wherein the computer readable program code is further configured to control the receiving device to call a kernel function that sets the current tracking tag to the tracking tag included in the header of the incoming TCP packet.

* * * * *